(12) United States Patent
Libin et al.

(10) Patent No.: US 12,262,068 B1
(45) Date of Patent: Mar. 25, 2025

(54) ADAPTIVE AUDIO FOR ENHANCING INDIVIDUAL AND GROUP CONSUMPTION OF IMMERSIVE ASYNCHRONOUS AUDIO-VIDEO CONTENT

(71) Applicant: mmhmm inc., Bentonville, AR (US)

(72) Inventors: Phil Libin, Bentonville, AR (US); Leonid Kitainik, San Jose, CA (US)

(73) Assignee: mmhmm inc., Bentonville, AR (US)

( * ) Notice: Subject to any disclaimer, the term of this patent is extended or adjusted under 35 U.S.C. 154(b) by 285 days.

(21) Appl. No.: 17/981,556

(22) Filed: Nov. 7, 2022

Related U.S. Application Data

(63) Continuation-in-part of application No. 17/359,227, filed on Jun. 25, 2021, now Pat. No. 11,714,595.
(Continued)

(51) Int. Cl.
*H04N 21/2187* (2011.01)
*G06F 3/16* (2006.01)
(Continued)

(52) U.S. Cl.
CPC ........... *H04N 21/2187* (2013.01); *G06F 3/16* (2013.01); *G06F 16/685* (2019.01); *G10L 25/63* (2013.01)

(58) Field of Classification Search
CPC ...... G06F 3/011; G06F 3/0304; G06F 3/1454; G06F 3/16; G06F 16/685; G06F 16/78; G06Q 30/0633; G06Q 30/0643; G06Q 50/01; G06V 20/46; G06V 40/17; G10L 25/63; G11B 27/005; G11B 27/031; H04L 12/1822; H04L 67/14; H04L 51/04; H04L 63/08; H04L 65/1083; H04L 67/62; H04N 21/21805; H04N 21/2187; H04N 21/2385; H04N 21/25841; H04N 21/2668; H04N 21/4223; H04N 21/44213; H04N 21/4422; H04N 21/4788; H04N 21/8173; H04N 7/147; H04N 7/15; H04N 21/25875;
(Continued)

(56) References Cited

U.S. PATENT DOCUMENTS 9,679,331 B2 * 6/2017 Gottlieb ............. G06Q 30/0633
10,666,941 B1 * 5/2020 Doron ............... H04N 21/21805
(Continued)

*Primary Examiner* — Gerald Gauthier
(74) *Attorney, Agent, or Firm* — Muirhead and Saturnelli, LLC

(57) ABSTRACT

Providing a shared experience of a pre-recorded video content on video screens of devices of a plurality of participants includes presenting, on the video screens, video content corresponding to the pre-recorded video having superimposed thereon a live video feed, determining feedback of the participants to the video content, providing to the devices background noise that varies according to the feedback of the participants, and altering acoustic properties of sound for the video content provided to the devices based on acoustic properties of an emulated presentation space for the video content. Altering acoustic properties may include varying echo and reverberation levels and intensities of the sound. Altering acoustic properties may use secondary echo-generating audio reproduction sources for varying echo and emulators of reverberating surfaces for varying reverberation levels. A subset of the participants may be immersed in the emulated presentation space. The sound audio properties may be different for different participants.

31 Claims, 12 Drawing Sheets

Related U.S. Application Data

(60) Provisional application No. 63/062,504, filed on Aug. 7, 2020.

(51) Int. Cl.
*G06F 16/683* (2019.01)
*G10L 25/63* (2013.01)

(58) Field of Classification Search
CPC ... H04N 21/44222; H04W 12/06; G06T 7/70; G06T 7/75
USPC ............ 348/36; 704/235; 705/26.8; 709/204
See application file for complete search history.

(56) References Cited

U.S. PATENT DOCUMENTS

| | | | | |
|---|---|---|---|---|
| 10,721,499 | B2* | 7/2020 | Chang | H04N 21/21805 |
| 10,887,628 | B1* | 1/2021 | Flachsbart | G06V 20/46 |
| 11,245,947 | B1* | 2/2022 | Sabo | H04N 21/25841 |
| 11,677,575 | B1* | 6/2023 | Libin | H04L 12/1822 |
| | | | | 709/204 |
| 11,792,355 | B1* | 10/2023 | Libin | G06F 3/011 |
| | | | | 348/36 |
| 11,800,060 | B1* | 10/2023 | Libin | G06V 40/174 |
| 11,929,095 | B1* | 3/2024 | Libin | G11B 27/005 |
| 2015/0106227 | A1* | 4/2015 | Gottlieb | G06Q 30/0643 |
| | | | | 705/26.8 |
| 2015/0288927 | A1* | 10/2015 | Haginas | H04N 7/147 |
| | | | | 348/14.03 |
| 2016/0127710 | A1* | 5/2016 | Saban | G11B 27/005 |
| | | | | 386/241 |
| 2016/0248830 | A1* | 8/2016 | Jaynes | H04L 63/08 |
| 2016/0277802 | A1* | 9/2016 | Bernstein | H04N 21/44213 |
| 2016/0306504 | A1* | 10/2016 | Brunsch | H04L 51/04 |
| 2017/0124664 | A1* | 5/2017 | Savenok | G06Q 50/01 |
| 2017/0371501 | A1* | 12/2017 | Wang | G06F 3/1454 |
| 2017/0373870 | A1* | 12/2017 | Hrustanovic | H04L 67/62 |
| 2018/0014037 | A1* | 1/2018 | Venkatraman | G06F 16/78 |
| 2018/0035145 | A1* | 2/2018 | Grubbs | H04L 67/14 |
| 2018/0124136 | A1* | 5/2018 | Faulkner | H04N 7/15 |
| 2018/0146216 | A1* | 5/2018 | Chang | H04N 21/2187 |
| 2018/0205797 | A1* | 7/2018 | Faulkner | H04L 65/1083 |
| 2019/0111346 | A1* | 4/2019 | Payzer | H04N 21/4788 |
| 2019/0124370 | A1* | 4/2019 | Chang | H04N 21/4223 |
| 2019/0132650 | A1* | 5/2019 | Kedenburg, III | H04N 21/4223 |
| 2019/0268627 | A1* | 8/2019 | Drako | H04W 12/06 |
| 2019/0342634 | A1* | 11/2019 | Folgner | H04N 21/4788 |
| 2020/0021872 | A1* | 1/2020 | Venkatraman | H04N 21/2668 |
| 2020/0038764 | A1* | 2/2020 | Perlman | H04N 21/2385 |
| 2020/0068262 | A1* | 2/2020 | Saldana | H04N 21/8173 |
| 2020/0236296 | A1* | 7/2020 | Holzer | G06T 7/70 |
| 2021/0195300 | A1* | 6/2021 | Thattamangalam-narayanan | H04N 21/44222 |
| 2021/0225017 | A1* | 7/2021 | Holzer | G06T 7/75 |
| 2021/0227195 | A1* | 7/2021 | Holzer | G11B 27/031 |
| 2021/0390953 | A1* | 12/2021 | Makker | G06F 3/0304 |

* cited by examiner

ADAPTIVE AUDIO FOR ENHANCING INDIVIDUAL AND GROUP CONSUMPTION OF IMMERSIVE ASYNCHRONOUS AUDIO-VIDEO CONTENT

CROSS-REFERENCE TO RELATED APPLICATIONS

This application is a continuation-in-part of U.S. patent application Ser. No. 17/359,227, filed on Jun. 25, 2021, and entitled "ADAPTIVE AUDIO FOR IMMERSIVE INDIVIDUAL CONFERENCE SPACES", which claims priority to U.S. Prov. App. No. 63/062,504, filed on Aug. 7, 2020, and entitled "ADAPTIVE AUDIO FOR IMMERSIVE INDIVIDUAL CONFERENCE SPACES WITH SHARED VIRTUAL CHANNELS", both of which are incorporated herein by reference.

TECHNICAL FIELD

This application is directed to the field of audio-video conferencing and presentation of information, and more particularly to the field of supplying adaptive audio capabilities for enhancing individual and group consumption of audio-video content with immersive presenters and participants.

BACKGROUND OF THE INVENTION

Video content is emerging as a dominant productivity medium in many areas, including professional training, education, e-commerce, marketing, product development and support, business communications and presentations, hiring, consulting, etc. The global enterprise video market size is expected to increase from $33 billion in 2020 to $49 billion by 2030.

An average person is predicted to spend about 100 minutes per day watching online videos. Product and service explainer videos are being watched by over 95% of Internet users and 84% of the watchers made their purchase decision after the video. It is estimated that viewers can retain about 95% of the information found in a video compared to just 10% information after reading a text.

Video repositories with rich feature sets have emerged in different content areas for storing online and local video. Public, group, and enterprise video repositories may save content in multiple video formats, provide hosting, authoring, editing, and sharing options, content categorization and tagging, authoring and usage analytics, social features, and consumption, etc. Such repositories may also include libraries of reusable video content for content creators and commenters. Notable examples of video repositories for public online video streaming include dedicated video platforms YouTube, Bilibili, Twitch, Aparat, IQiyi, Vimeo, Youku. General sites and social networks that offer video hosting among their features include Facebook, Tencent, Sina Weibo, Instagram, Twitter. Brightcove, DaCast, Dailymotion Cloud represent some of the popular video hosting providers for businesses, while online video editing services include Animoto, Clesh, Dailymotion, Blackbird, etc.

With the rise of a geographically dispersed workforce and in response to challenges caused by the COVID-19 pandemic, remote and distributed work style is becoming pervasive, bringing to life new types of hybrid companies with dispersed teams that are beginning to shape the future of knowledge work. The new metaphor of communications, where an asynchronous content created by employees is consumed by individual co-workers and teams through enterprise video repositories, such as mmhmm TV channels, is proliferating and augmenting in-person meeting and video conferencing. Such enterprise video content repositories allow video sharing and streaming among employees, existing and prospective customers, partners, and other relevant parties, without a need for content authors and presenters to participate in every information exchange and content viewing session.

One of the mechanisms of collective video sharing has evolved independently from the formation of video content repositories and is best known as a Watch Party, initially defined as a social gathering for the purpose of watching a specific event or program on television. Advanced watch party applications, such as collective watching features associated with specific video content providers (Netflix, Hulu, Amazon Prime, Disney+ GroupWatch, TikTok, Instagram) or provided by the third-party aggregator apps that allow viewing different content sources and services (Scener, TeleParty, Kast), include a variety of features, for example, initiation of a party by an organizer, switching between supported video sources (services, repositories), selection methods for the video to watch, playback control, different types of communication between the party participants, such as text, voice, or video chat, etc.

The next generation of watch party applications may also be associated with the arrival of AR technologies and immersive applications, such as the mmhmm application developed by mmhmm inc. New capabilities include personal presence of multiple participants within a shared watch party space, where each participant may be presented not only by a chosen avatar but also by a real-time image of each participant, captured by the front-facing camera of each participant on a mobile or a desktop device, separated (segmented) from the video stream and superimposed upon the meeting party environment. Additionally, immersive participants of a watch party may jointly choose one or several watching spaces, such as halls, lawns, pools, parks, or abstract structures and backdrops. The target video may be played in a virtual channel located anywhere in the watching space, and participants may freely move their images around the space and even immerse their images into the target video.

SUMMARY OF THE INVENTION

Notwithstanding a significant progress in the video content development and in the methods of individual and collective watching of the asynchronous pre-recorded video content, there is a need for multiple improvements. One of the most demanding areas calling for enhancements is the audio component of video products and services. Differences in audio equipment, software, bandwidth, and compression technologies used by participants of a watch party may cause significant issues with the watch party experiences. In addition, advanced capabilities, and expressive opportunities of audio systems in collective video consumption are greatly underused.

Accordingly, it is important to develop techniques and systems for adaptive audio solutions accompanying individual and group consumption of the asynchronous immersive video content.

According to the system described herein, providing a shared experience of a pre-recorded video content on video screens of devices of a plurality of participants includes presenting, on the video screens, video content corresponding to the pre-recorded video having superimposed thereon a live video feed, determining feedback of the participants to the video content, providing to the devices background noise that varies according to the feedback of the participants, and altering acoustic properties of sound for the video content provided to the devices based on acoustic properties of an emulated presentation space for the video content. Altering acoustic properties may include varying echo and reverberation levels and intensities of the sound. Altering acoustic properties may use secondary echo-generating audio reproduction sources for varying echo and emulators of reverberating surfaces for varying reverberation levels. A subset of the participants may be immersed in the emulated presentation space. Audio properties of the sound for at least some of the subset of the participants may be different from audio properties for other ones of the participants. Audio properties of the sound for at least some of the subset of the participants may vary based on where the at least some of the subset of the participants are positioned inside emulated presentation space. The audio properties of the sound for at least some of the subset of the participants may vary according to a distance to a presenter that is speaking in the pre-recorded video. The audio properties of the sound for at least some of the subset of the participants may vary according to a direction that the presenter is speaking. Audio properties of the sound for at least some of the participants may vary according to a distance to a presenter that is speaking in the pre-recorded video. The audio properties of the sound for at least some of the participants may vary according to a direction that the presenter is speaking. At least some of the participants may replay portions of the video content. At least some of the participants may search the pre-recorded video for replay using a text transcript of the video content to find a specific portion to replay. At least some of the participants may find a specific portion to replay by searching a text transcript corresponding to speech of a presenter that speaks in the prerecorded video. The text transcript may be searchable by typing or speaking a portion of the transcript. The text transcript may be provided by performing speech to text conversion of at least some of the pre-recorded video. Markers may be placed in the video content based on a detected emotional state of a presenter that is speaking in the pre-recorded video. The markers may be modified based on the feedback of the participants. The feedback of the participants may be based on facial recognition, sentiment recognition, gesture recognition, voice recognition, and/or natural language processing. The background noise may also vary according to changing expressive and emotional states of the participants and a presenter that is speaking in the pre-recorded video. The feedback of the participants may be used to generate emulated audience feedback, synthesized audience feedback, and/or natural audience feedback. The emulated audience feedback may be a burst of applause. The feedback may be generated during feedback windows that occur between pauses of a presenter that is speaking in the live video feed. The feedback windows may also occur during emphatic portions of the speech. A presenter may be speaking in the pre-recorded video and one of the participants may be speaking in the live video feed. Providing a shared experience of a pre-recorded video content on video screens of devices of a plurality of participants may also include separating fragments of speech of the presenter and the one of the participants in response to the presenter and the one of the participants speaking at the same time. The fragments of speech may be from different audio streams.

According further to the system described herein, a non-transitory computer readable medium contains software that, when executed, provides a shared experience of a pre-recorded video content on video screens of devices of a plurality of participants. The software includes executable code that presents, on the video screens, video content corresponding to the pre-recorded video having superimposed thereon a live video feed, executable code that determines feedback of the participants to the video content, executable code that provides to the devices background noise that varies according to the feedback of the participants, and executable code that alters acoustic properties of sound for the video content provided to the devices based on acoustic properties of an emulated presentation space for the video content. Altering acoustic properties may include varying echo and reverberation levels and intensities of the sound. Altering acoustic properties may use secondary echo-generating audio reproduction sources for varying echo and emulators of reverberating surfaces for varying reverberation levels. A subset of the participants may be immersed in the emulated presentation space. Audio properties of the sound for at least some of the subset of the participants may be different from audio properties for other ones of the participants. Audio properties of the sound for at least some of the subset of the participants may vary based on where the at least some of the subset of the participants are positioned inside emulated presentation space. The audio properties of the sound for at least some of the subset of the participants may vary according to a distance to a presenter that is speaking in the pre-recorded video. The audio properties of the sound for at least some of the subset of the participants may vary according to a direction that the presenter is speaking. Audio properties of the sound for at least some of the participants may vary according to a distance to a presenter that is speaking in the pre-recorded video. The audio properties of the sound for at least some of the participants may vary according to a direction that the presenter is speaking. At least some of the participants may replay portions of the video content. At least some of the participants may search the pre-recorded video for replay using a text transcript of the video content to find a specific portion to replay. At least some of the participants may find a specific portion to replay by searching a text transcript corresponding to speech of a presenter that speaks in the prerecorded video. The text transcript may be searchable by typing or speaking a portion of the transcript. The text transcript may be provided by performing speech to text conversion of at least some of the pre-recorded video. Markers may be placed in the video content based on a detected emotional state of a presenter that is speaking in the pre-recorded video. The markers may be modified based on the feedback of the participants. The feedback of the participants may be based on facial recognition, sentiment recognition, gesture recognition, voice recognition, and/or natural language processing. The background noise may also vary according to changing expressive and emotional states of the participants and a presenter that is speaking in the pre-recorded video. The feedback of the participants may be used to generate emulated audience feedback, synthesized audience feedback, and/or natural audience feedback. The emulated audience feedback may be a burst of applause. The feedback may be generated during feedback windows that occur between pauses of a presenter that is speaking in the live video feed. The feedback windows may also occur during emphatic portions of the speech. A presenter may be speaking in the pre-recorded video and one of the participants may be speaking in the live video feed. The software may also include executable code that separates fragments of speech of the presenter and the one of the participants in response to the presenter and the one of the participants speaking at the same time. The fragments of speech may be from different audio streams.

The proposed system creates an adaptive audio environment with foreground, background and combined adaptation features for individual and shared consumption of immersive video content, which includes generating productivity stimulating background noise, customizable to audience feedback; altering acoustic properties of a presentation space, including immersion of watch party participants into the presentation space; generating emulated, recorded and instant audio feedback; creating and replaying semantic and expressive audio markers; altering a voice direction, location, and characteristics of a presenter; allowing search and brief reference-based replays of video fragments; and providing diarization with untangling double talk between a presenter and an immersed participant of the watch party.

Various aspects of system functioning are explained as follows.

1. Immersive watch party. Participants of an immersive watch party join a shared virtual environment to view pre-selected video content. Video may be playing in a virtual channel located on any surface in the virtual environment: a wall, ceiling, floor, virtual monitor screen, etc. Distributed participants are, for the most part, viewing their own screens, which display copies of the shared virtual environment, where the target pre-selected video content is playing in a virtual channel, and the images of each or most participants (viewers) are represented either by avatars or by immersed images of the participants captured by front-facing cameras of devices of the participants (notebooks, smartphones, tablets), immersed into the shared virtual environment. Such watch parties may be organized on immersive video platforms, such as mmhmm or Loom.

While the pre-selected video content may be arbitrary, the system described herein deals predominantly with pre-recorded (asynchronous) and immersive video presentations, where an image of the presenter may be displayed in front of the presentation materials, delivering to the audience live speech with articulation, facial expressions, and gestures. The image of the presenter may be automatically or manually repositioned by the presenter during the presentation, may be made semi-transparent to ensure an always-visible mode for material in the presentation, and may be altered by using color and other visual effects.

2. Creating adaptive audio streams for presentations from individual conference spaces is aimed at enhancing presentation quality, attractiveness, and comprehension. Adaptive features of audio streams may include background, foreground and combined adaptation features explained below.

3. Generating background sounds as a productivity and attention booster, helping watch party participants to relax, focus on the presentation, and cope with the environmental sound pollution. Applications like Noise Generator, myNoise, A Soft Murmur, etc., may add variously colored and themed background noise that may be adapted to various presentation types and modes. In addition to predefined background noise chosen by the presenter at the time of recording the asynchronous video, the system may support customizable background noise, reflecting both the presentation materials and the audience attitude, which may be measured by employing facial and gesture recognition for each participant of the watch party, registering verbal and non-verbal communications of the participants, and feeding the captured data into the sentiment recognition component of the system, which may interact with the background noise generation system and alter the generated noise as needed. In principle, it is possible to generate several different background noises simultaneously and customize the background noises for individual users of the watch party, overlapping a separate audio channel for background noise over the rest of the audio stream of the presentation and the watch party audio, external to the presentation.

4. Altering acoustic properties of presentation and watch party spaces. Depending on the presentation logic, number of presenters and members of the original presentation, and other factors, the system may emulate various presentation spaces (different from the watch party environment, which is external to the video content recorded during the presentation), from an individual room or a recording studio to a large conference hall. Acoustic properties of such spaces may be introduced, for example, by varying echo and reverberation levels and intensities. Introducing acoustic properties is a combined background/foreground feature that may be altered during a presentation. For example, if new presenters join the panel with their own presentation material, the system may emulate an effect of expanding the conference space. In another embodiment, some of the participants of the watch party may be immersed into the presentation space of the pre-recorded but still interactive and editable video content and may occupy, for example, an empty chair or replace an existing presenter or member of the asynchronous presentation. In this case, the audio properties of the space may vary for those individual participants of the watch party and may be delivered to computing devices of the participants individually by altering a replay audio channel for copies of the participants of the watch party stream.

Analogously to the acoustic properties of the presentation space for the pre-recorded video content, the acoustic properties of the watch party space (external to the video content replayed on a surface within the watch party space) may be altered to create a more participant-friendly environment.

5. Generating audience feedback. Acoustic audience feedback may be fully emulated, synthesized from background feed, and natural; combinations of the three types of feedback are also possible.

a. Speech and appearance of the presenter in asynchronous audio content may be analyzed using a technology stack, including facial, gesture, voice emotion and voice recognition technologies, natural language processing, sentiment recognition and other technologies to identify emphatic portions of the speech, pauses and other feedback-friendly speech intervals. The system may build the schedule of feedback windows within the presentation used to add emulated, synthesized, or natural feedback to the presentation.

b. Emulated audience feedback may be in the form of pre-recorded or auto-generated laugh, sigh, applaud, happy or angry exclamations, etc., similar to soap operas or other entertainment venues. Specifics of the emulated audience feedback may be derived from the same information about the presentation as has been used to build a schedule of feedback windows. Additionally, the system may analyze the audience (watch party) sentiment using similar technique and combine the presenter and audience related data in determining the type and parameters of the emulated feedback.
  c. Synthesized feedback may utilize a deferred feedback mode, whereby the system may capture, identify and record brief feedback to the video content by the watch party members to a fragment of speech of the presenter shortly before the presenter seeks audience feedback, so the audience may react to the most recent thought or phrase of the presenter, and the feedback may be collected in the background, pre-processed, mixed and broadcast within a next feedback window.
  d. Natural feedback may follow the same routine as the synthesized feedback, except there may be no preprocessing or artificial mixing; the system may signal a request for live audio reaction from the participants of the watch party right before an upcoming feedback window (such signals may be presented, for example, in various visual formats); the feedback is instantly replayed (it may also be combined with the synthesized replay of the recorded feedback assigned to the same feedback window).
    Audience feedback may be further acoustically and visually enhanced by changing spatial acoustic properties to the presentation and the watch party environment.
6. Generating and reproducing semantic and expressive background audio markers. In addition to the synthesized background noise (if present) and in response to changing expressive and emotional presenter and audience states, the system may generate background audio markers reflecting an emotional state (anger, satisfaction, excitement, happiness, etc.) of the presenter and may accompany each state with such a marker for a duration of the state, for a short introductory period, or periodically.
    Recognition and categorization of audio markers for presenter speech may use the same technique and technology stack as for other tasks explained elsewhere herein. Audio markers may also reflect audience sentiment, as explained elsewhere herein.
7. Altering voice direction and location. During presentations, presenter(s) image (real-life video, emulated avatar, immersed silhouette, or other entity) may move within the conference space, including zoom-out, zoom-in, and relocation of presenter image(s) with a purpose of pointing to presentation materials, marking up the materials, switching to a different virtual of physical channel, such as a whiteboard or a flipchart, etc. Additionally, multiple presenters may move synchronously or independently, form discussion panels with or without visual presentation materials, etc. The system may enhance audience perception from the presentation by emulating spatial origin of each speech source and a distance of each speech source from the listeners, including location and direction of each track, following the movement of each presenter along the conference space or across each instance of the presentation materials. Such voice direction and location of the presenter voice source may be relative to a position of an observer (viewer, watch party member) and may be customized in the replay of the video content on different computing devices of the watch party members.
8. Brief replays. Within the social environment of a watch party, distractions and attention lapses of the participants are possible, and audience-driven replays of short portions of the video content may be beneficial. Conventional video controls (stop-play-rewind-scroll) may be augmented with a reference-driven search and replay. Specifically, the text transcript of speech of the presenter(s) may be used for a search of the desired replay fragment of the video content. The system may further facilitate the search by registering time intervals within the watch party when missing the presentation flow by the participants is more likely—for example, when multiple participants talk, chat or a gaze direction of the participants is away from the replay of the presentation (on devices with eye tracking technology or applications). Subsequently, the system may highlight the transcript of the presentation audio for such intervals where distraction may occur. The system may also use synonym search and other enhancement methods.
9. Untangling multi-person speech episodes. In the event when a participant (or a group of participants) of a watch party joins the presentation via immersion and talks within the presentation space (as opposed to the watch party space), it is possible that voice streams of one or more participants and the original presenter overlap, creating a cross talk episode. The system may isolate each source audio if the presenter and participant(s) have been separately recorded before mixing (for example, a presenter of an asynchronous video presentation and an individual participant of a watch party) or process the mixed stream to obtain diarization otherwise (multiple immersed participants produce a cross talk episode). Subsequently, the system may offer different on-demand options of replaying speech fragments of separate participants and presenter, either sequentially or selectively.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein offers an adaptive audio environment with foreground, background, and combined adaptation features for individual and shared consumption of immersive video content.

Figure 1:
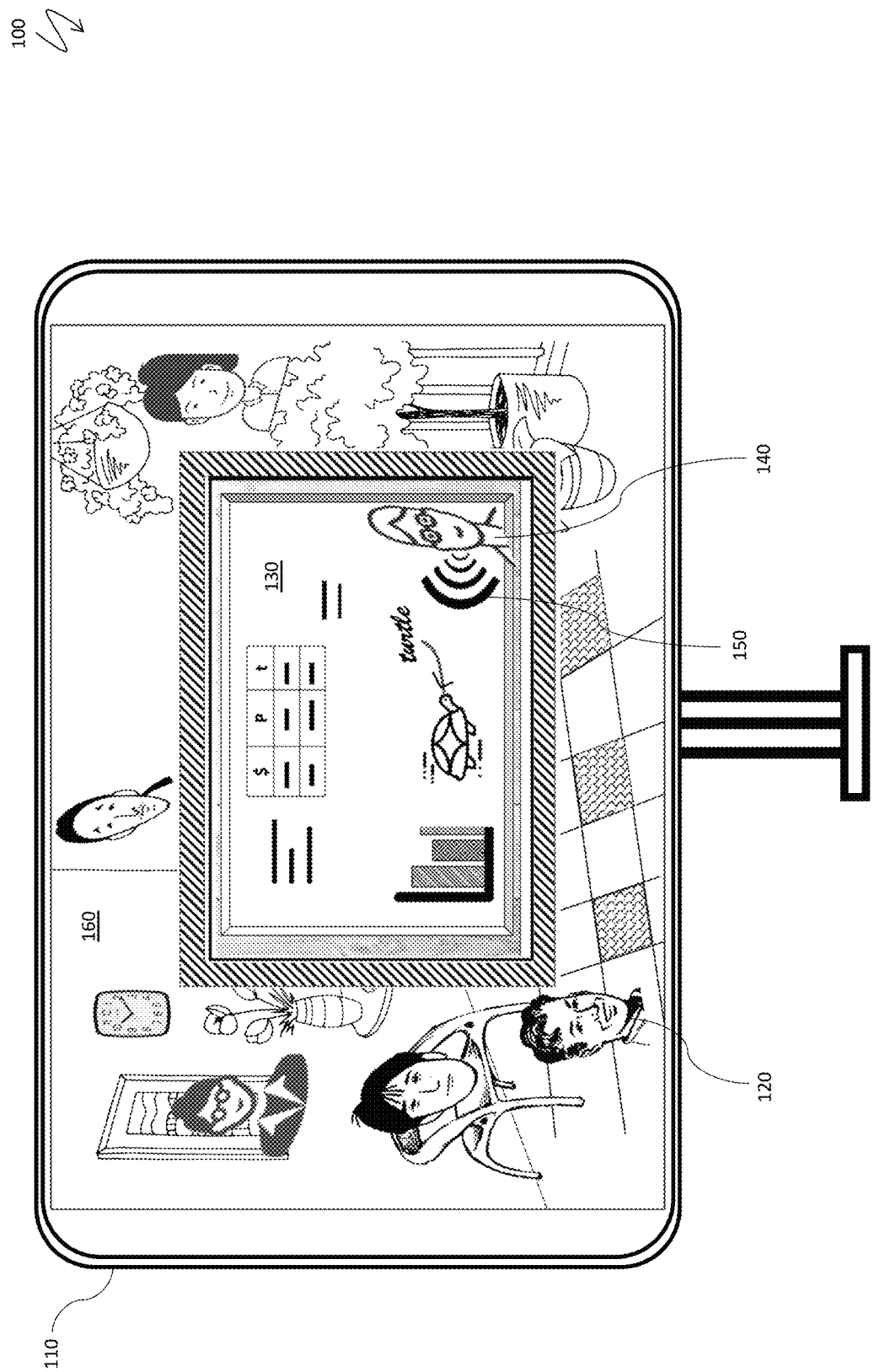
FIG. 1 is a schematic illustration of a watch party, according to an embodiment of the system described herein.

FIG. 1 is a schematic illustration 100 of a watch party. A computer screen or other display 110 shows a watch party with participants gathered to view and discuss asynchronous pre-recorded video content 130 playing within a watch party environment 160. Participants are immersed into a watch party environment 160 and are listening to a presentation talk 150 given by a presenter 140.

Figure 2A:
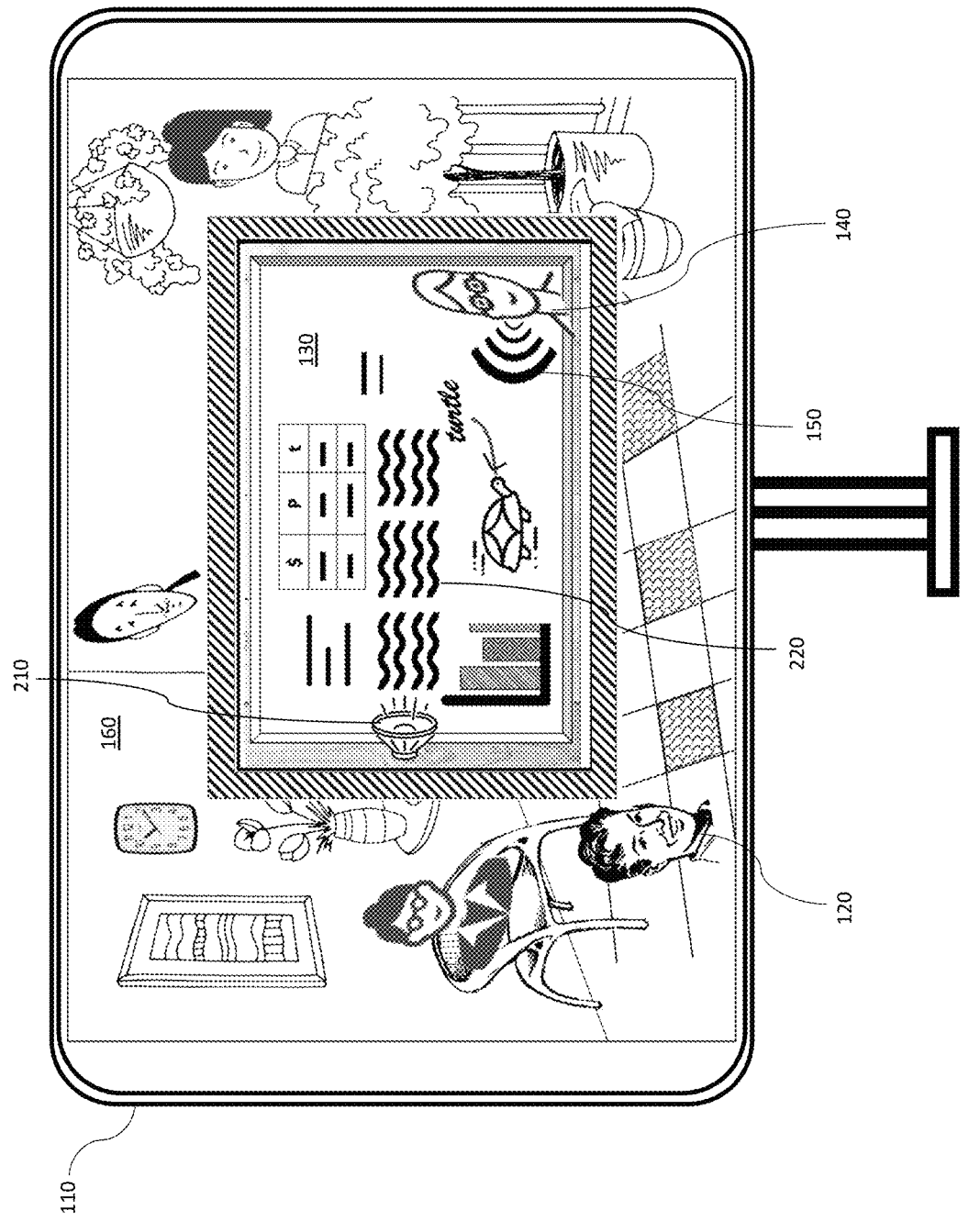
FIGS. 2A-2B are schematic illustrations of generation of regular and customized productivity enhancing background sounds, according to an embodiment of the system described herein.
Figure 2B:
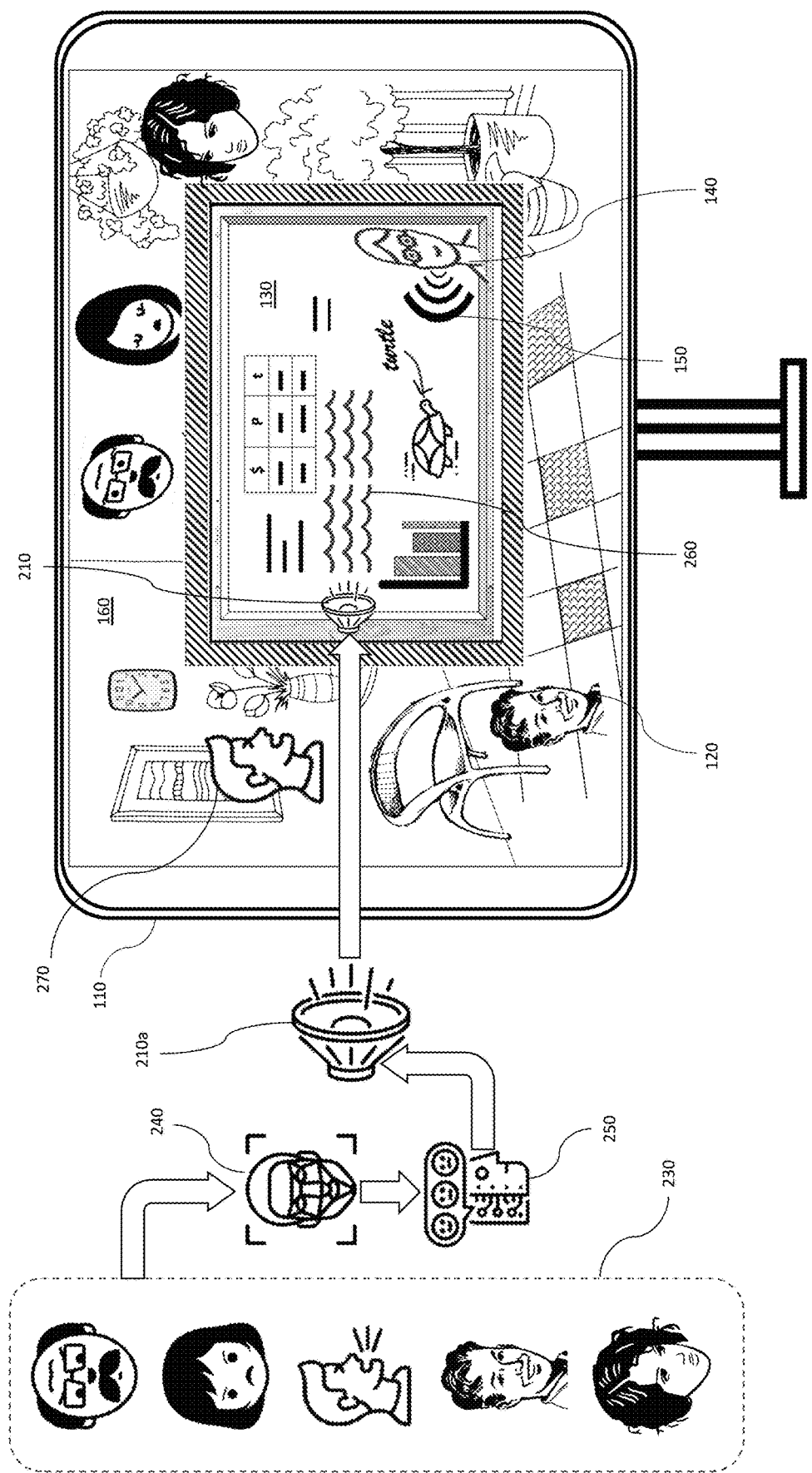

FIGS. 2A-2B are schematic illustrations of generation of regular and customized productivity enhancing background sounds.

FIG. 2A is a schematic illustration of a regular background noise generated in conjunction with a presentation. Analogously to the FIG. 1, a computer screen 110 or other display shows a watch party gathered within the watch party environment 160, where the participants are viewing the asynchronous pre-recorded video content 130. Participants are immersed into the watch party environment 160 and are listening to the presentation talk 150 given by the presenter 140. A background audio generation component 210 produces a predefined background noise 220 accompanying the talk 150 of the presenter 140, as explained elsewhere herein (see Section 3 of the Summary).

FIG. 2B is a schematic illustration of a customized background noise generated in conjunction with the presentation talk 150 and reflecting audience reaction to the presentation talk 150. Analogously to the FIG. 1, the display 110 shows the watch party environment 160, where the immersed participants view the asynchronous pre-recorded video content 130 and are listening to the presentation talk 150 by the presenter 140. The background audio generation component 210 produces the predefined background noise 220 accompanying the talk 150 of the presenter 140, as explained elsewhere herein (see Section 3 of the Summary). The feedback and reaction to the video content by a group 230 of the participants is assessed by a technology stack, including facial recognition 240 and sentiment recognition 250 (other technologies such as gesture recognition, voice recognition and natural language processing for recognized and typed text by participants may also be integrated into the sentiment recognition component). Reaction and feedback of the participant may be used by the system to modify the background noise generated by the system, as schematically illustrated by an additional audio generation component 210a, which interacts with the original background noise generation component 210, embedded into the presentation environment and causes generation of a modified background noise 260, customized for the audience reaction. (Note that the customized background noise may also be individualized for some or all the distributed participants, as explained in Section 3 of the Summary.)

Figure 3A:
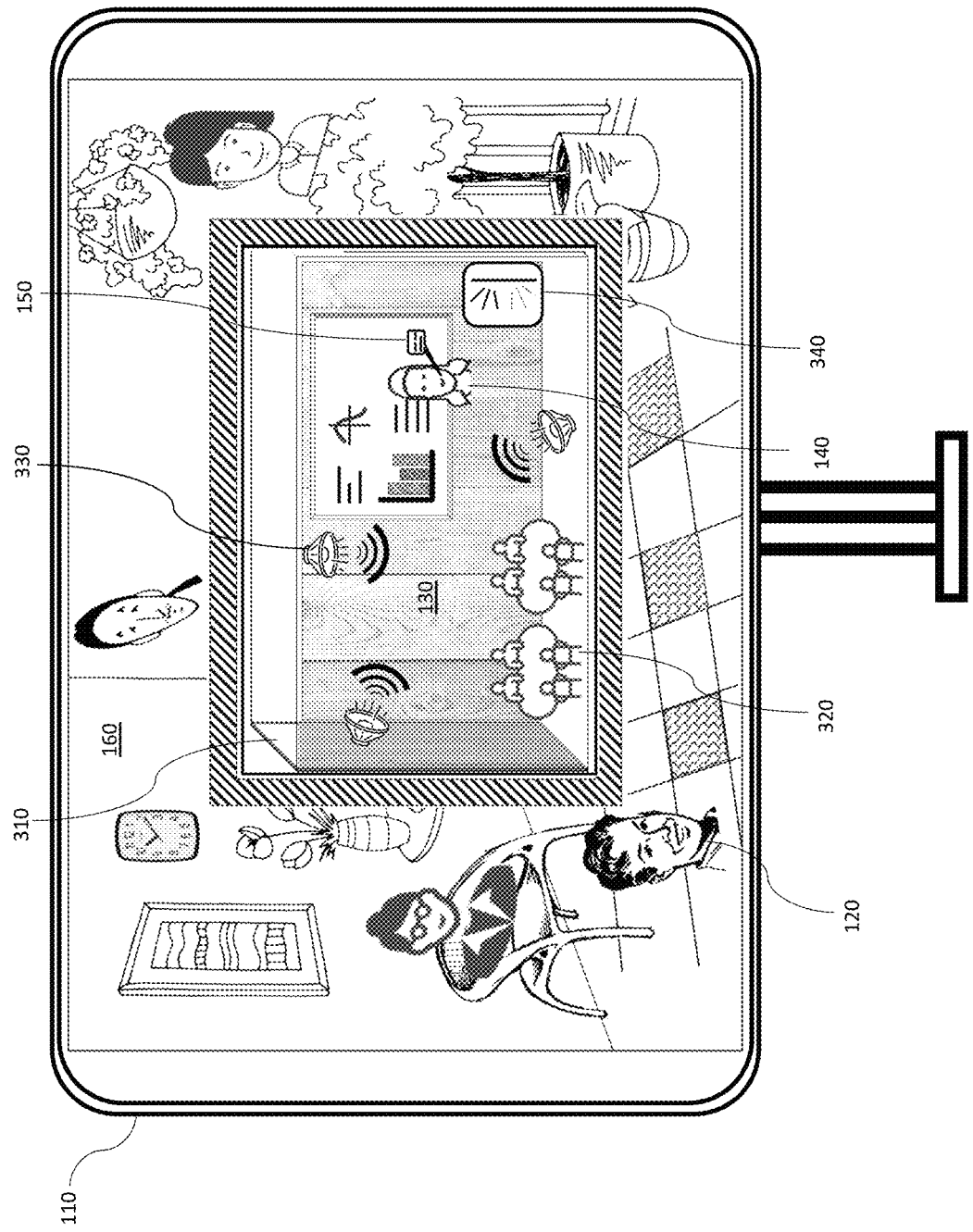
FIGS. 3A-3B are schematic illustrations of regular and customized altering of acoustic properties of a presentation space, according to an embodiment of the system described herein.
Figure 3B:
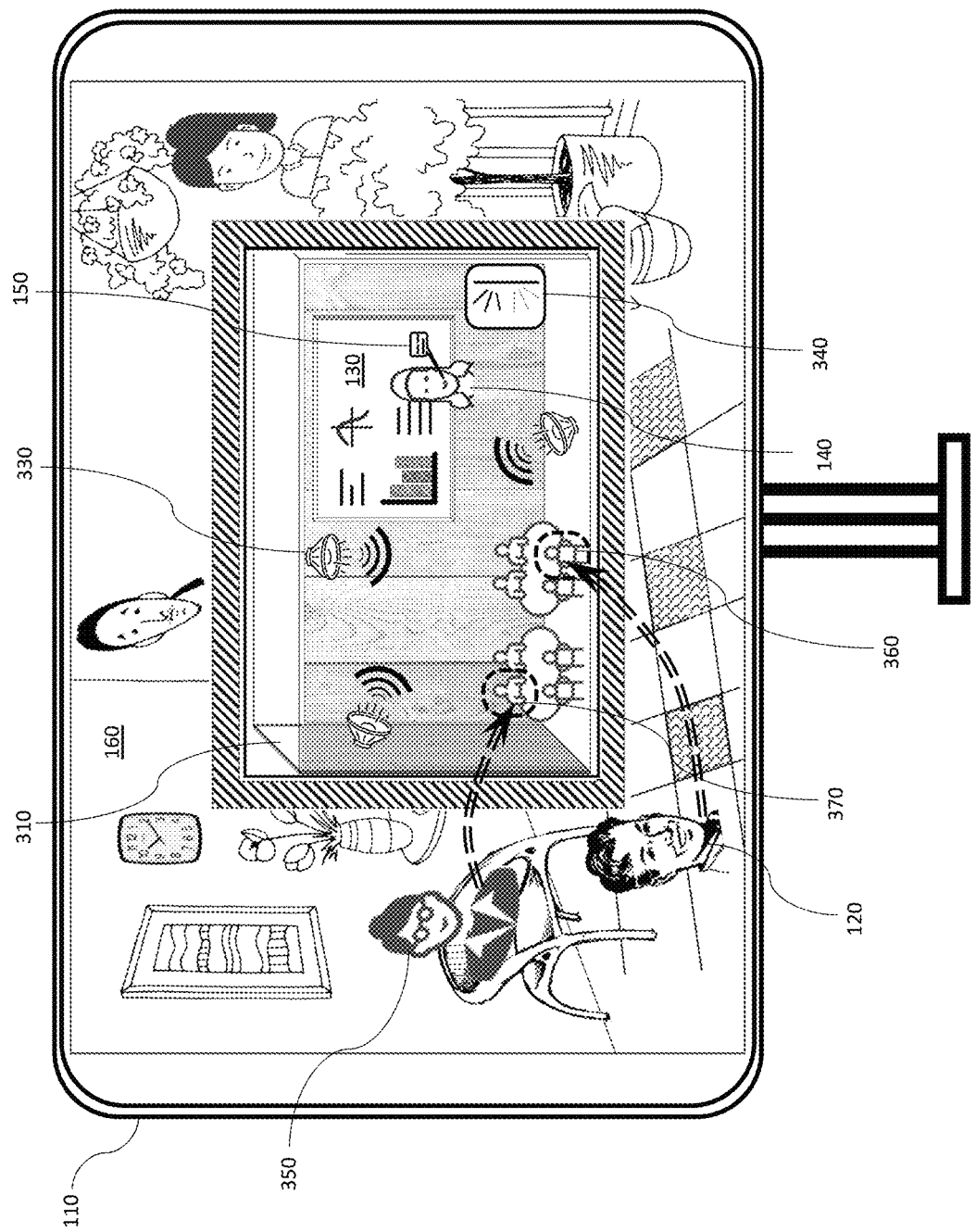

FIGS. 3A-3B are schematic illustrations of the regular and customized altering of acoustic properties of a presentation space.

FIG. 3A is a schematic illustration of regular altering of acoustic properties of a presentation space. The watch party environment 160 may be expanded to a hall 310 with additional partakers 320 where the original presentation is replayed as pre-recorded video content in the watch party environment 160. As with FIG. 1, the watch party environment is displayed on the screen 110. Some of the partakers 320 may be co-presenters with the presenter 140 or with alternative presenters replacing the presenter 140. To sound naturally for the participants of the watch party, acoustic properties of the hall are different from small individual conference spaces shown in FIGS. 1, 2A-2B. Modifying the acoustic properties may be achieved by addition of secondary echo-generating audio reproduction sources 330, emulators of reverberating surfaces 340, etc. that provide combined foreground/background feature applied both to voice of the presenter(s) and to all types of background noise.

FIG. 3B is a schematic illustration of customized altering of acoustic properties of a presentation space. Presentation space for the watch party environment 160 is expanded to the hall 310 with the additional participants 320, but with an audio immersion of two participants 120, 350 of the watch party into the presentation space 310 where the two participants 120, 350 replace two partakers 360, 370. In other words, the two participants 120, 350 of the watch party would like to hear the video content as if the two participants 120, 350 were inside the presentation space. In this case, the echo-generating audio reproduction sources 330 and the emulators of reverberating surfaces 340 may be individually tuned to provide the correct spatial sound experiences to the audio immersive users 120, 350. Each of the users 120, 350 will receive customized audio streams on their individual computing devices, emulating their acoustic presence in the appropriate locations of the presentation space.

Figure 4A:
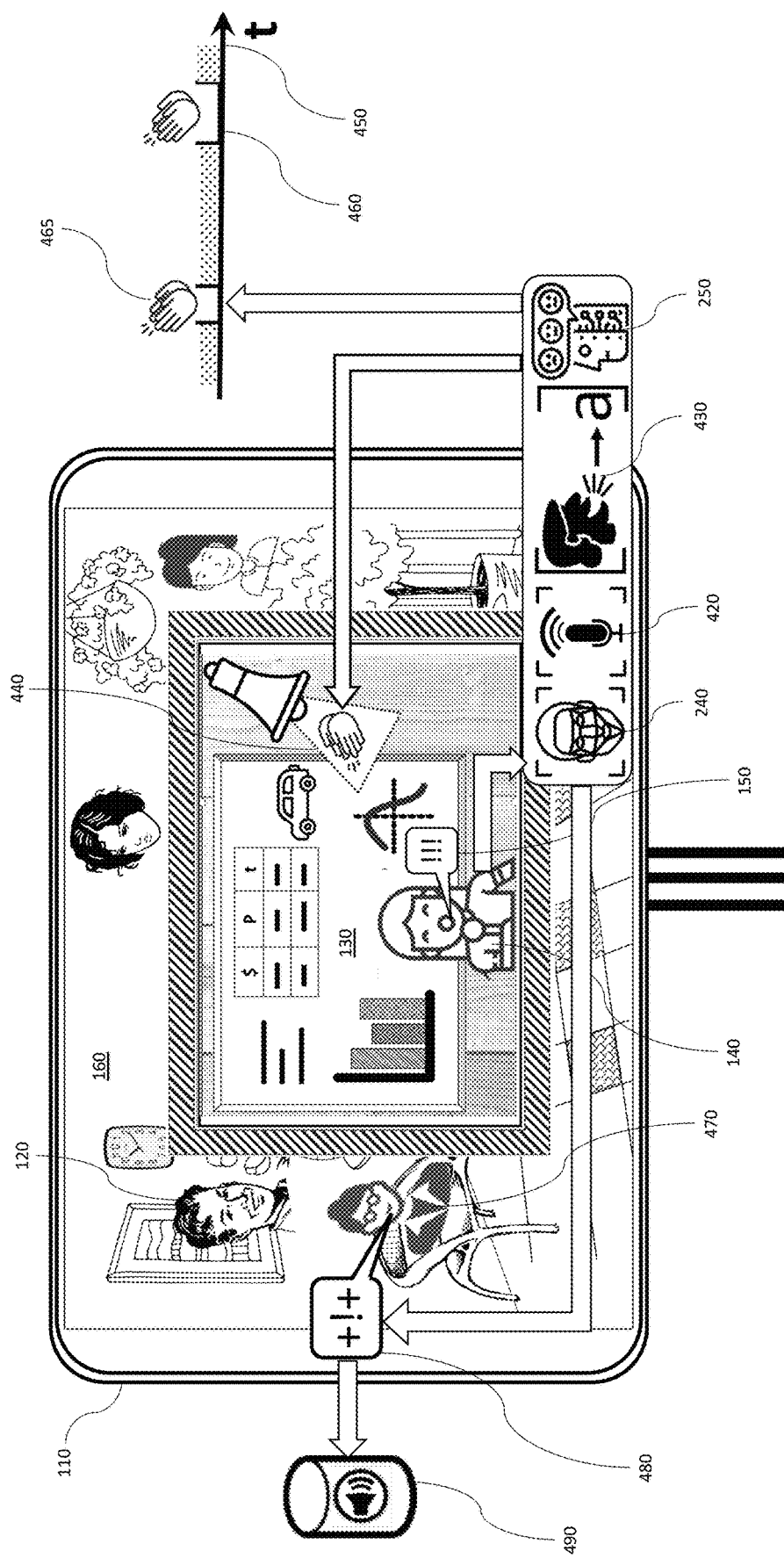
FIGS. 4A-4B are schematic illustrations of providing emulated, pre-processed, and live audience feedback, according to an embodiment of the system described herein.
Figure 4B:
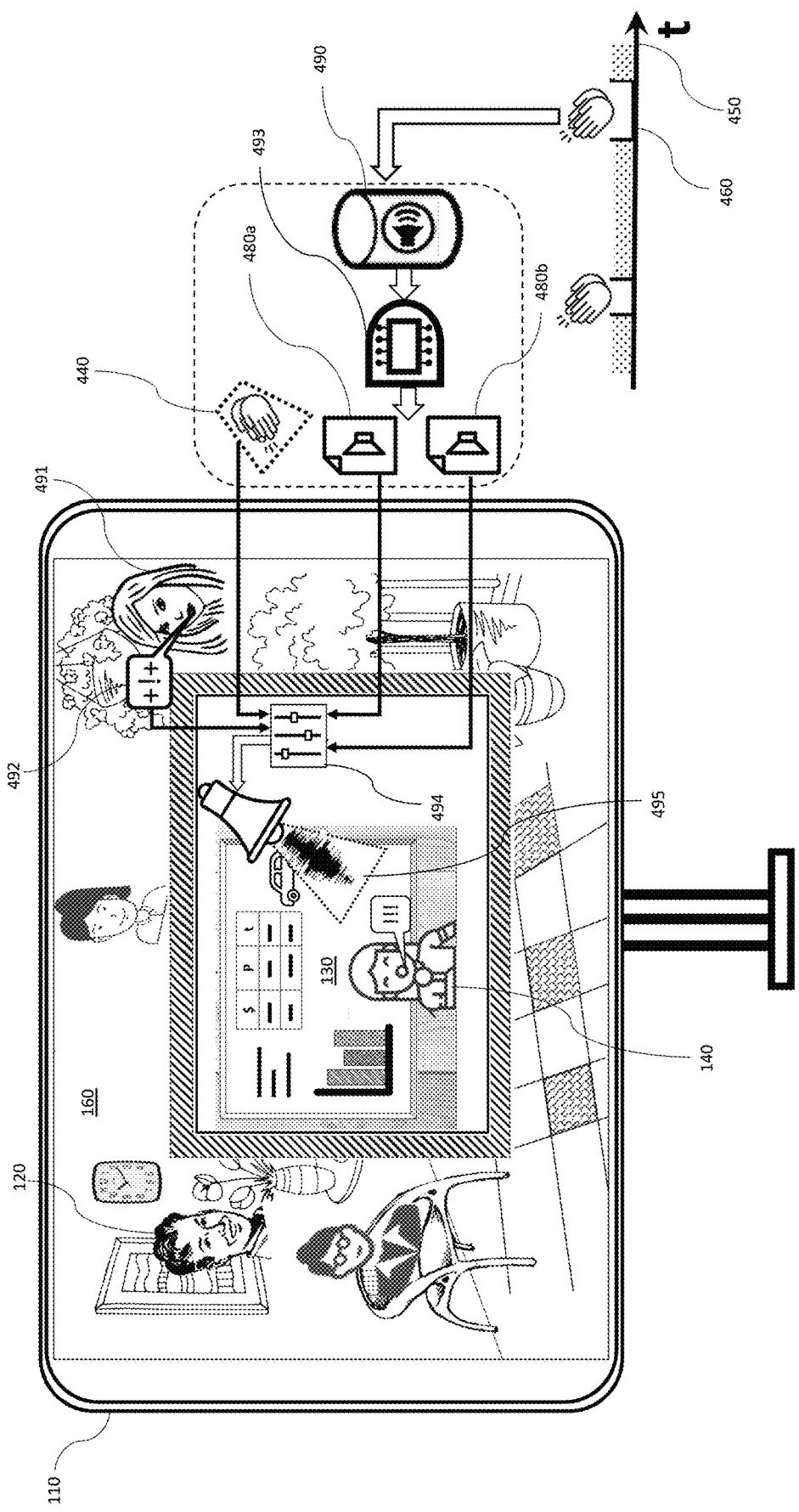

FIGS. 4A-4B are schematic illustrations of providing emulated, pre-processed, and live audience feedback to asynchronous video content.

FIG. 4A is a schematic illustration of providing emulated audience feedback to asynchronous video content. The watch party environment 160 is displayed on the screen 110 and includes the participants watching the asynchronous video content 130 shown by the presenter 140 and explained in the talk 150 of the presenter 140. A technology stack including the facial recognition 240, voice emotion recognition 420, speech-to-text conversion (speech recognition) 430 with natural language processing (NLP), and the sentiment recognition 250 (additional components such as gesture recognition may also be included) continuously monitors the presentation 140 and builds a schedule of feedback windows 460, 465 on a presentation timeline 450, as explained elsewhere herein. The feedback window 465 is used for playing emulated feedback 440 (such as a burst of applause) within the presentation environment. In the absence of the live presenter (video content is asynchronous and pre-recorded), the role of the feedback window 465 is increasing awareness and emotional engagement of the watch party members.

A participant 470 provides feedback 480 during the watch party. The feedback 480 is identified and analyzed by a same technology component, as shown by a block arrow. An audio clip of the feedback 480 is saved into a recorded feedback database 490 for future use.

FIG. 4B is a schematic illustration of providing a mix of emulated, pre-processed, and live audience feedback to asynchronous video content. The watch party environment 160 is displayed on the screen 110 and includes the participants watching the asynchronous video content 130 with the presenter 140. At the start of the feedback window 460 on the presentation timeline 450, an audio processing component 493 analyzes the content of the feedback database 490 of stored audio clips and chooses two best fitting audio clips 480a, 480b for mixed feedback by participant(s) of the watch party (see FIG. 4A for more information). Simultaneously, the system plays the emulate feedback 440 as in FIG. 4A. Finally, a participant 491 provides live feedback 492. All four parts 480a, 480b, 440, 492 of audio feedback are sent to a sound mixing component 494, which generates reproduced feedback 495.

Figure 5:
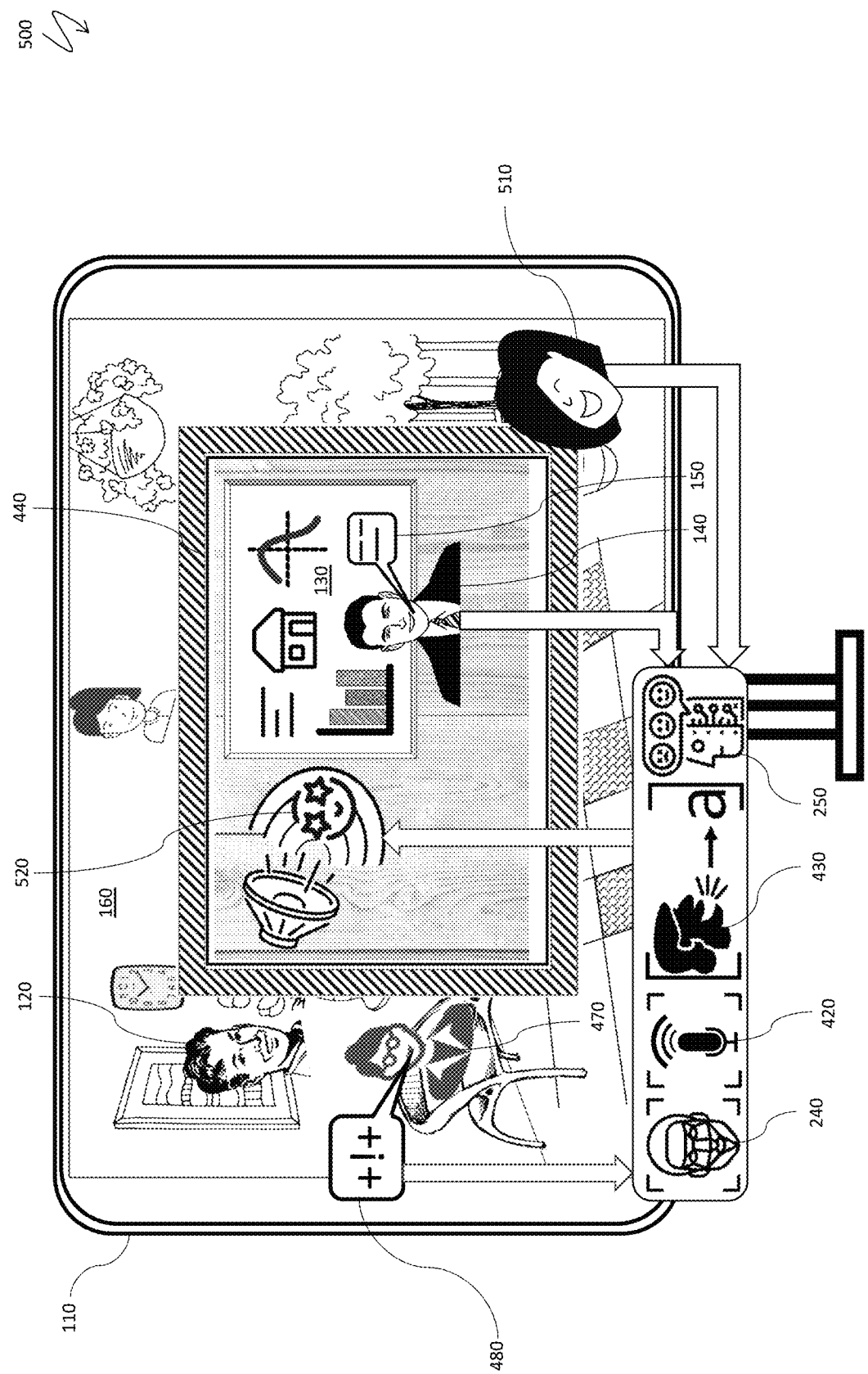
FIG. 5 is a schematic illustration of generating audio markers, according to an embodiment of the system described herein.

FIG. 5 is a schematic illustration 500 of generating audio markers. The watch party environment 160 is displayed on the screen 110 and includes the participants watching the asynchronous video content 130 explained by the presenter 140 in the talk 150 of the presenter 140. An original presentation related audio marker is built by analyzing appearance and speech of the presenter 140 by a technology stack containing the facial recognition 240, the voice emotion recognition 420, the speech-to-text conversion (speech recognition) 430 with natural language processing (NLP), and the sentiment recognition 250 (extra components such as gesture recognition may be added). The original audio markers may be modified by reflecting non-verbal participant feedback, such as facial expression of a participant 510, and verbal participant feedback, such as the feedback 480 of the participant 470, analyzed by the same technology stack. A resulting audio marker 520 reflects a certain emotional state of the presenter 140 and/or a phase of the presentation, supplemented with audience feedback; the marker 520 may accompany the corresponding state with for duration of the marker 520, for a short introductory time, or periodically, as explained elsewhere herein (see Section 6 of the Summary).

Figure 6:
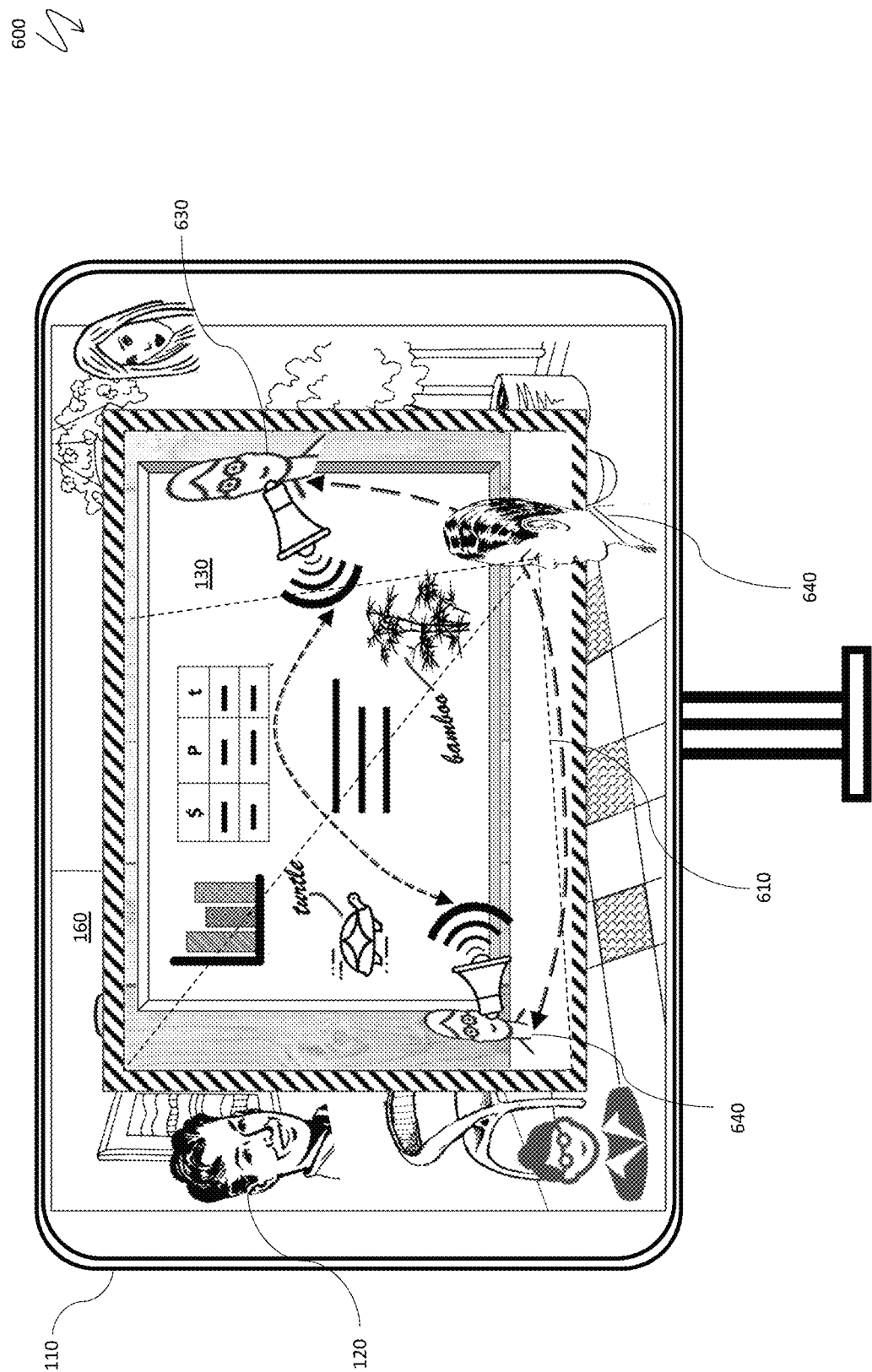
FIG. 6 is a schematic illustration of acoustic following of movements of a presenter with voice direction and location, according to an embodiment of the system described herein.

FIG. 6 is a schematic illustration 600 of sound following of movements of a presenter with voice direction and location. The watch party environment 160 is displayed on the screen 110 and includes the participants watching the asynchronous video content 130. The presenter 140 may move through the presentation space as shown by arrows 610 and by locations 620, 630 of the presenter 140. The appearance of the presenter 140, including size, may also vary. Accordingly, the system may emulate a change of location and direction of a source of voice of the presenter 140 to each new location and direction, creating a more realistic adaptive audio arrangement for the participants. Such acoustic following may be uniform for all participants emulating a single common location of a listener (participant) or may be adapted to a custom position or a participant with respect to a presentation space, illustrated by the participant 640 who receives a custom audio stream of the talk of the presenter, potentially different in its acoustic following of movements of the presenter from other listeners (participants).

Figure 7:
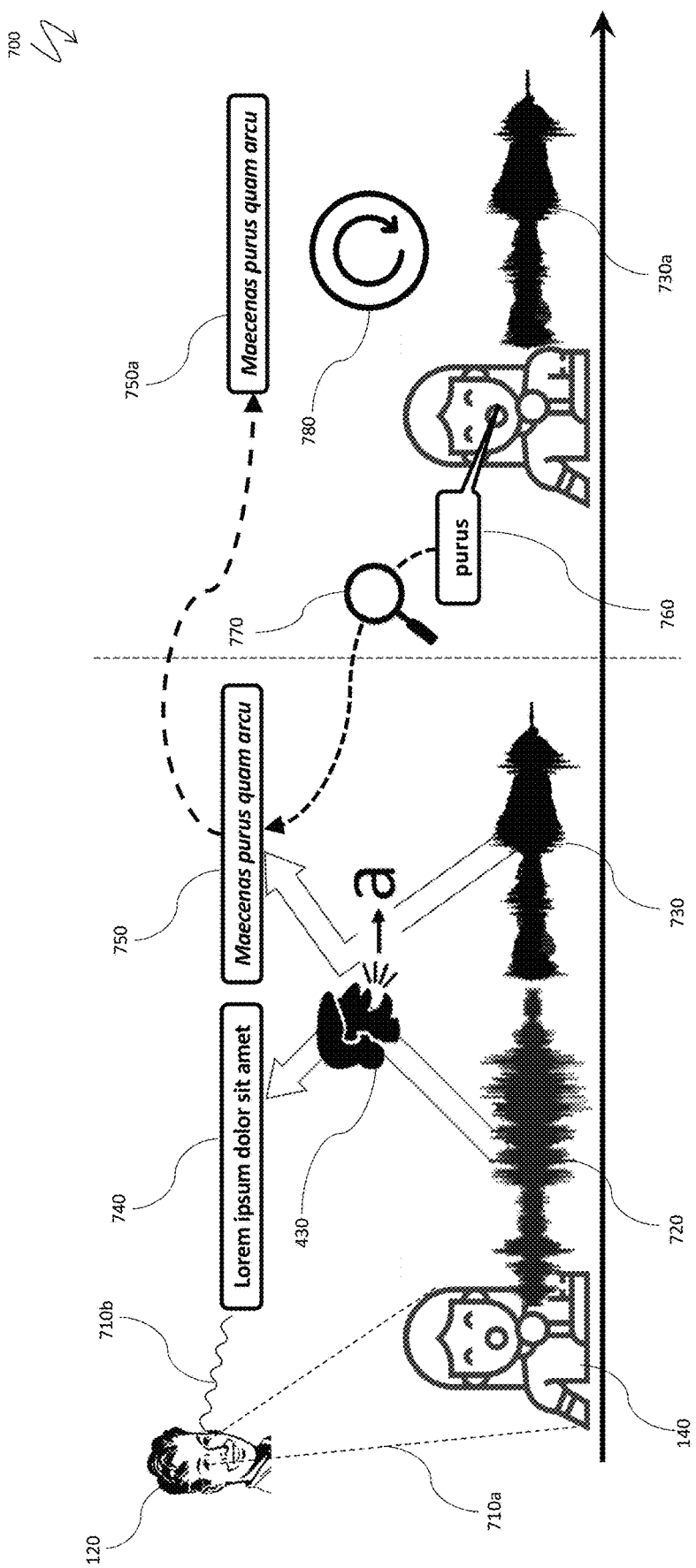
FIG. 7 is a schematic illustration of replaying presentation fragments by voice-driven text references, according to embodiments of the system described herein.

FIG. 7 is a schematic illustration 700 of replaying presentation fragments by voice-driven text references. The participant 120 of the watch party (or an individual listener) watches a video presentation by the presenter 140, as illustrated by dashed lines 710a, and listens to a talk of the presenter 140, illustrated by an oscillating line 710b. The talk of the presenter 140 includes fragments 720, 730 (for example, phrases) transcribed by the speech-to-text conversion (speech recognition) 430 into text fragments 740, 750. A transcript is presented to the participant 120 on demand or permanently in conjunction with the video content. The transcript may also be marked up (not shown in FIG. 7), as explained in Section 8 of the Summary. The participant 120 may pronounce or type in a brief text 760 (such as a word) from the presentation and use a search function 770 to restore a corresponding fragment 750a and replay 780 a voice portion 730a of the fragment 750a. Several enhancements, such as search by synonyms and selection of a desired fragment from a list of candidate fragments that include the same or similar search terms are not shown in FIG. 7.

Figure 8:
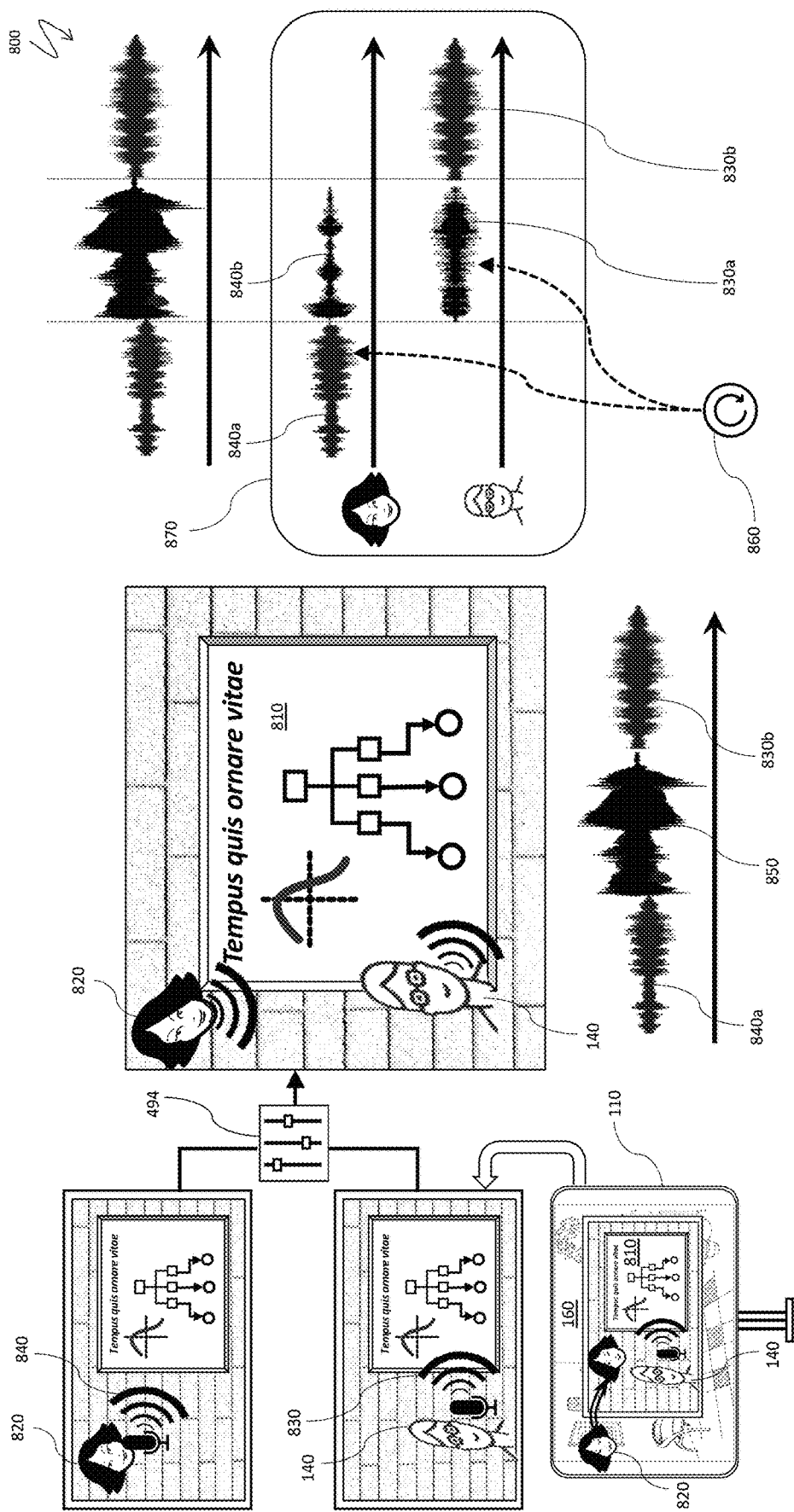
FIG. 8 is a schematic illustration of untangling overlapping multi-person speech fragments, according to an embodiment of the system described herein.

FIG. 8 is a schematic illustration 800 of untangling overlapping multi-person speech fragments. The presenter 140 presents a slide 810 of the asynchronous video content. A participant 820 of a watch party gathered in the watch party environment 160 immerses herself into the presentation space to explain or comment on the presentation. An audio stream 830 representing the talk of the presenter 140 is mixed by the sound mixing component 494 with the audio stream 840 of explanations or comments by the participant 820 and includes a fragment 840a of talk of the participant 820, a fragment 830b of talk of the presenter 140 and a fragment 850 of double talk that may be difficult for comprehension by the rest of the participants of the watch party. Accordingly, the system may use a pre-recorded audio channel of the presenter 140 and a synchronously recorded (simultaneously with sound mixing) audio channel of the participant 820 to untangle the double talk and synchronize clear talk (the fragments 840a, 840b) of the participant 820 and clear talk (the fragments 830a, 830b) of the presenter 140, as shown by a synchronization symbol 860. Alternatively, the double talk fragment 850 may be untangled by using one of a variety of known diarization techniques. The untangled talk fragments by different speakers may be arranged into a speaker channel pane 870, enabling replay by presenter and talking fragments.

Figure 9:
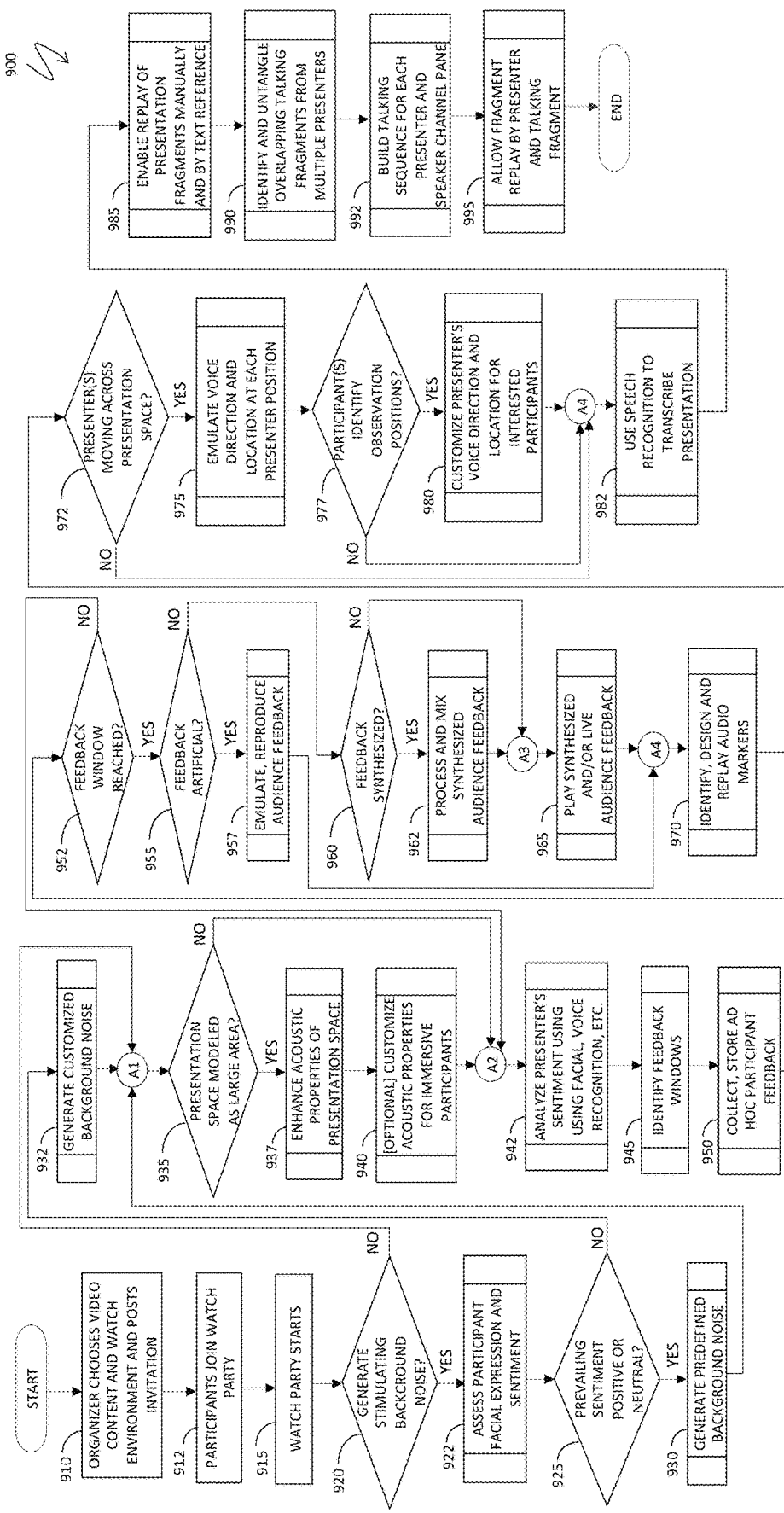
FIG. 9 is a system flow diagram illustrating system functioning in connection with creation of an adaptive audio environment for a watch party organized for viewing an asynchronous video presentation, according to an embodiment of the system described herein.

Referring to FIG. 9, a system flow diagram 900 illustrates system functioning in connection with an adaptive audio environment for immersive individual conference spaces. Processing begins at a step 910, where an organizer of a watch party chooses an asynchronous video content and watch party environment and posts invitations to participants. After the step 910, processing proceeds to a step 912, where participants join the watch party. After the step 912, processing proceeds to a step 915, where the watch party starts (see FIG. 1, for example). After the step 915, processing proceeds to a test step 920, where it is determined whether there is an immediate need to generate a background noise, as explained elsewhere herein (see FIGS. 2A-2B and the accompanying text). If so, processing proceeds to a step 922, where the system assesses participant facial expression and sentiment. After the step 922, processing proceeds to a test step 925, where it is determined whether the prevailing participant sentiment is positive or neutral. If so, processing proceeds to a step 930, where the system chooses noise color and other parameters and generates predefined background noise associated with the current portion of the video content. If it is determined at the test step 925 that the prevailing sentiment of the participants is neither positive nor neutral, processing proceeds to a step 932 where a customized background noise reflecting the presentation theme and the audience sentiment is generated and reproduced, as explained elsewhere herein (see, for example, FIG. 2B and the accompanying text).

After the step 930 or the step 932, processing proceeds to a test step 935, where it is determined whether the presentation space is modeled as a large area, such as a conference hall. Note that the test step 935 may be independently reached from the test step 920 if it is determined that there is no immediate need to generate a productivity stimulating background noise. If the presentation space is modeled as a large area, processing proceeds to a step 937, where the acoustic properties of the presentation space are enhanced (see FIG. 3A and the accompanying text, for example). After the step 937, processing proceeds to an optional step 940, where the system customizes acoustic properties of the presentation space for participants of the watch party who have immersed themselves into the presentation space from the watch party environment (see FIG. 3B and the accompanying text, for example). After the step 940, processing proceeds to a step 942, where the system analyzes sentiment of the presenter, emotional states and pauses in the talk of the presenter using a technology stack that combined facial, voice emotion and voice recognition and other technologies which are discussed, for example, in connection with FIG. 4A. Note that the step 942 may be independently reached from the test step 935 if it is determined that the presentation space is not modeled as a large area. After the step 942, processing proceeds to a step 945, where the system identifies feedback windows and builds the schedule of feedback windows, also discussed in connection with FIG. 4A and the accompanying text. After the step 945, processing proceeds to a step 950, where ad hoc participant feedback is collected and stored in the feedback database.

After the step 950, processing proceeds to a test step 952, where it is determined whether a feedback window is reached within the video content flow and the talk of the presenter. If not, processing proceeds to the step 942, which may be independently reached from the step 940 and the test step 935. Otherwise, if the feedback window is reached within the video content flow and the talk of the presenter, processing proceeds from the test step 952 to a test step 955, where it is determined whether newly generated feedback is artificial (emulated). If so, processing proceeds to a step 957, where the system emulates audio feedback by the participants of the watch party and reproduces the audio feedback in the presentation space. If it is determined at the test step 955 that the audience feedback is not artificial, processing proceeds to a test step 960 where it is determined whether the feedback is synthesized from the entries of the feedback database (see, for example, FIGS. 4A-4B and the accompanying text). If so, processing proceeds to a step 962, where the system processes, selects and mixes stored entries from the feedback database. After the step 962, processing proceeds to a step 965, where the system plays synthesized and/or live audience feedback. Note that the step 965 may be independently reached from the test step 960 if it is determined that the feedback is not synthesized, and hence it is solely the live feedback by one or more of the participants.

After the step 957 or the step 965, processing proceeds to a step 970, where the system identifies, designs and replays audio markers, as explained elsewhere herein (see FIG. 5, for example). After the step 970, processing proceeds to a test step 972, where it is determined whether the presenter (or multiple presenters) of the video content is (are) moving across the presentation space. If so, processing proceeds to a step 975, where the system emulates voice direction and location at each variable position(s) of the presenter(s). After the step 975, processing proceeds to a test step 977, where it is determined whether participant(s) of the watch party have identified their preferred observation point(s) with respect to the presentation space. If so, processing proceeds to a step 980, where variable voice direction(s) and location(s) of the voice source of the presenter(s) are customized to reflect the position(s) of interested participant(s) who have chosen preferred observation point(s), as explained elsewhere herein (see, for example, FIG. 6 and the accompanying text).

After the step 980, processing proceeds to a step 982, where speech recognition (STT) technology is used to transcribe the talk of the presenter (and other audio portions of the video content, if necessary). Note that the step 982 may be independently reached from the test step 977, if it is determined that participants of the watch party do not choose preferred observation points, and from the test step 972, if it is determined that the presenter(s) of the video content are not moving across the presentation space. After the step 982, processing proceeds to a step 985, where replay of fragment of video content is enabled either using conventional video interface or by text reference, as explained elsewhere herein (see, for example, FIG. 7 and the accompanying text). After the step 985, processing proceeds to a step 990, where overlapping talking fragments by multiple speakers (for example, a presenter and an immersed commenter, represented by a participant of the watch party) are identified and untangled, as explained, for example, in conjunction with FIG. 8. After the step 990, processing proceeds to a step 992, where talking sequences by each speaker are restored and arranged in a speaker channel pane (see, for example, FIG. 8 and the corresponding text). After the step 992, processing proceeds to a step 995, where the system allows replay of the content of the speaker channel pane and talking fragment by the presenter. After the step 995, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations and functioning may vary from the illustrations presented herein. Further, various aspects of the system described herein may be deployed on various devices, including, but not limited to notebooks, smartphones, tablets and other mobile computers. Smartphones and tablets may use operating system(s) selected from the group consisting of: IOS, Android OS, Windows Phone OS, Blackberry OS and mobile versions of Linux OS. Notebooks and tablets may use operating system selected from the group consisting of Mac OS, Windows OS, Linux OS, Chrome OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of providing a shared experience of a pre-recorded video content on video screens of devices of a plurality of participants, comprising:
    presenting, on the video screens, video content corresponding to the pre-recorded video having superimposed thereon a live video feed;
    determining feedback of the participants to the video content;
    providing to the devices background noise that varies according to the feedback of the participants; and
    altering acoustic properties of sound for the video content provided to the devices based on acoustic properties of an emulated presentation space for the video content, wherein altering acoustic properties includes varying echo and reverberation levels and intensities of the sound.

2. The method of claim 1, wherein a subset of the participants is immersed in the emulated presentation space.

3. The method of claim 2, wherein audio properties of the sound for at least some of the subset of the participants are different from audio properties for other ones of the participants.

4. The method of claim 2, wherein audio properties of the sound for at least some of the subset of the participants varies vary based on where the at least some of the subset of the participants are positioned inside emulated presentation space.

5. The method of claim 3, wherein the audio properties of the sound for at least some of the subset of the participants vary according to a distance to a presenter that is speaking in the pre-recorded video.

6. The method of claim 5, wherein the audio properties of the sound for at least some of the subset of the participants vary according to a direction that the presenter is speaking.

7. The method of claim 1, wherein at least some of the participants replay portions of the video content.

8. The method of claim 7, wherein at least some of the participants search the pre-recorded video for replay using a text transcript of the video content to find a specific portion to replay.

9. The method of claim 7, wherein at least some of the participants find a specific portion to replay by searching a text transcript corresponding to speech of a presenter that speaks in the prerecorded video.

10. The method of claim 8, wherein the text transcript is searchable by typing or speaking a portion of the transcript.

11. The method of claim 8, wherein the text transcript is provided by performing speech to text conversion of at least some of the pre-recorded video.

12. The method of claim 1, wherein markers are placed in the video content based on a detected emotional state of a presenter that is speaking in the pre-recorded video.

13. The method of claim 12, wherein the markers are modified based on the feedback of the participants.

14. The method of claim 1, wherein the feedback of the participants is based on at least one of: facial recognition, sentiment recognition, gesture recognition, voice recognition, and natural language processing.

15. The method of claim 1, wherein the background noise also varies according to changing expressive and emotional states of the participants and a presenter that is speaking in the pre-recorded video.

16. The method of claim 1, wherein the feedback of the participants is used to generate at least one of: emulated audience feedback, synthesized audience feedback, or natural audience feedback.

17. The method of claim 16, wherein the emulated audience feedback is a burst of applause.

18. The method of claim 16, wherein the feedback is generated during feedback windows that occur between pauses of a presenter that is speaking in the live video feed.

19. The method of claim 18, wherein the feedback windows also occur during emphatic portions of the speech.

20. The method of claim 1, wherein a presenter is speaking in the pre-recorded video and one of the participants is speaking in the live video feed.

21. The method of claim 20, further comprising:
    separating fragments of speech of the presenter and the one of the participants in response to the presenter and the one of the participants speaking at the same time.

22. The method of claim 21, wherein the fragments of speech are from different audio streams.

23. A method of providing a shared experience of a pre-recorded video content on video screens of devices of a plurality of participants, comprising:
    presenting, on the video screens, video content corresponding to the pre-recorded video having superimposed thereon a live video feed;
    determining feedback of the participants to the video content;
    providing to the devices background noise that varies according to the feedback of the participants; and
    altering acoustic properties of sound for the video content provided to the devices based on acoustic properties of an emulated presentation space for the video content, wherein altering acoustic properties uses secondary echo-generating audio reproduction sources for varying echo and emulators of reverberating surfaces for varying reverberation levels.

24. A method of providing a shared experience of a pre-recorded video content on video screens of devices of a plurality of participants, comprising:
    presenting, on the video screens, video content corresponding to the pre-recorded video having superimposed thereon a live video feed;
    determining feedback of the participants to the video content;
    providing to the devices background noise that varies according to the feedback of the participants; and
    altering acoustic properties of sound for the video content provided to the devices based on acoustic properties of an emulated presentation space for the video content, wherein audio properties of the sound for at least some of the participants vary according to a distance to a presenter that is speaking in the pre-recorded video.

25. The method of claim 24, wherein the audio properties of the sound for at least some of the participants vary according to a direction that the presenter is speaking.

26. A non-transitory computer readable medium containing software that, when executed, provides a shared experience of a pre-recorded video content on video screens of devices of a plurality of participants, the software comprising:

executable code that presents, on the video screens, video content corresponding to the pre-recorded video having superimposed thereon a live video feed;

executable code that determines feedback of the participants to the video content;

executable code that provides to the devices background noise that varies according to the feedback of the participants; and executable code that alters acoustic properties of sound for the video content provided to the devices based on acoustic properties of an emulated presentation space for the video content, wherein altering acoustic properties includes varying echo and reverberation levels and intensities of the sound.

27. The non-transitory computer readable medium of claim 26, wherein audio properties of the sound for at least some of the participants vary according to a distance to a presenter that is speaking in the pre-recorded video and a direction that the presenter is speaking.

28. The non-transitory computer readable medium of claim 26, wherein at least some of the participants replay portions of the video content after finding a specific portion to replay by searching a text transcript corresponding to speech of a presenter that speaks in the prerecorded video.

29. The non-transitory computer readable medium of claim 26, wherein the feedback of the participants is based on at least one of: facial recognition, sentiment recognition, gesture recognition, voice recognition, and natural language processing.

30. The non-transitory computer readable medium of claim 26, wherein the feedback of the participants is used to generate at least one of: emulated audience feedback, synthesized audience feedback, or natural audience feedback.

31. The non-transitory computer readable medium of claim 26, wherein a presenter is speaking in the pre-recorded video and one of the participants is speaking in the live video feed.

* * * * *